(12) United States Patent
Choe et al.

(10) Patent No.: US 6,484,193 B1
(45) Date of Patent: Nov. 19, 2002

(54) FULLY PIPELINED PARALLEL MULTIPLIER WITH A FAST CLOCK CYCLE

(75) Inventors: Gwangwoo Johnny Choe, Austin, TX (US); James R. MacDonald, Buda, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/365,160

(22) Filed: Jul. 30, 1999

(51) Int. Cl.[7] .............................................. G06F 7/52
(52) U.S. Cl. ...................... 708/625; 708/629
(58) Field of Search ................ 708/620, 607, 708/622, 625, 626, 627, 628, 629, 630, 631, 632, 702, 708, 710, 711, 712

(56) References Cited

U.S. PATENT DOCUMENTS

| | | | | |
|---|---|---|---|---|
| 3,515,344 A | * | 6/1970 | Goldschmidt et al. | |
| 4,706,211 A | * | 11/1987 | Yamazaki et al. | 708/630 |
| 5,146,421 A | * | 9/1992 | Adiletta et al. | 708/626 |
| 5,719,803 A | * | 2/1998 | Naffziger | 708/710 |

* cited by examiner

Primary Examiner—Chuong Dinh Ngo
(74) Attorney, Agent, or Firm—B. Noël Kivlin

(57) ABSTRACT

A fully pipelined parallel multiplier with a fast clock cycle. The pipelined parallel multiplier contains three units: a bit-product matrix unit, a reduction unit, and an addition unit. The bit-product matrix is configured to receive two binary numbers, a multiplier and a multiplicand. A bit-product matrix is formed based on these two numbers. The bit-product matrix unit forms a first pipeline stage. The bit-product matrix is latched to the reduction unit using d-type latch circuits. The reduction unit includes a plurality of reduction stages, with each reduction stage acting as a pipeline stage. The reduction unit reduces the matrix down to a two-row matrix. Intermediate results are latched from one stage to the next using d-type latch circuits. The reduction unit also contains a plurality of half-adder and full-adder circuits. The final two-row matrix formed by the reduction unit is then latched to an addition unit. The addition unit includes one or more stages of addition, with each stage also acting as a pipeline stage. Carry lookahead adder (CLA) circuits are cascaded to perform the addition, with one CLA per addition stage. Results from each addition stage are latched to the next stage using d-type latch circuits. The output from the final stage is the final product of the multiplication.

25 Claims, 9 Drawing Sheets

|   |   |   |   |   |   | $Y_7$ | $Y_6$ | $Y_5$ | $Y_4$ | $Y_3$ | $Y_2$ | $Y_1$ | $Y_0$ |
|---|---|---|---|---|---|---|---|---|---|---|---|---|---|
|   |   |   |   |   |   |   |   |   |   | $X_3$ | $X_2$ | $X_1$ | $X_0$ |
|   |   |   |   |   | $X_0Y_7$ | $X_0Y_6$ | $X_0Y_5$ | $X_0Y_4$ | $X_0Y_3$ | $X_0Y_2$ | $X_0Y_1$ | $X_0Y_0$ |   |
|   |   |   |   | $X_1Y_7$ | $X_1Y_6$ | $X_1Y_5$ | $X_1Y_4$ | $X_1Y_3$ | $X_1Y_2$ | $X_1Y_1$ | $X_1Y_0$ |   |   |
|   |   |   | $X_2Y_7$ | $X_2Y_6$ | $X_2Y_5$ | $X_2Y_4$ | $X_2Y_3$ | $X_2Y_2$ | $X_2Y_1$ | $X_2Y_0$ |   |   |   |
| $X_3Y_7$ | $X_3\overline{Y_6}$ | $X_3\overline{Y_5}$ | $X_3\overline{Y_4}$ | $X_3\overline{Y_3}$ | $X_3\overline{Y_2}$ | $X_3\overline{Y_1}$ | $X_3\overline{Y_0}$ |   |   |   |   |   |   |
| $\overline{X_3}$ |   |   |   |   |   |   |   |   |   |   |   |   |   |
| $\overline{Y_7}$ | $\overline{X_2}Y_7$ | $\overline{X_1}Y_7$ | $\overline{X_0}Y_7$ |   |   | $Y_7$ |   |   | $X_3$ |   |   |   |   |

FIG. 1
(Prior Art)

FULLY PIPELINED PARALLEL MULTIPLIER WITH A FAST CLOCK CYCLE

BACKGROUND OF THE INVENTION

1. Field of the Invention

The invention relates to arithmetic circuits in computer and digital signal processing systems, and more specifically, to multiplier circuits used for performing high-speed multiplications.

2. Description of the Related Art

Multipliers are one of the basic circuits of digital arithmetic. The speed at which a multiplier can deliver the product of two binary numbers becomes critical in certain applications where repetitive multiplications are required. Applications requiring repetitive multiplications include various digital signal processing functions, such as Finite Impulse Response (FIR) filters, and 3D rendering. Such applications require both high throughput and fast response time. The design of multipliers employed in these applications can have a significant effect on overall application performance.

Since multiplication is essentially repeated addition, it stands to reason that digital multipliers rely heavily on adder circuits. Commonly used adder circuits include the half-adder, the full-adder, and the carry-lookahead adder. The half adder takes two 1-bit inputs, and returns two outputs, a sum bit and a carry bit. A full adder returns the same outputs, but it has an extra input, known as a carry-in. The carry-in input is configured to receive a carry-out bit from an addition of lower-order bits. Because of the carry-in, full-adders can be cascaded to allow the addition of numbers larger than one bit. An adder formed by cascading several full adders is known as a ripple carry adder.

One problem with ripple carry adders is the fact that a carry generated at the lowest order bit position must be propagated through each subsequent bit position in a sequential manner. Such propagation adds a significant amount of time to the addition process. One solution to this problem is the carry-lookahead adder (CLA). In a CLA, the carry in bit is presented to each bit position in the adder, and is combined with the operand bits to either generate or propagate a carry. Therefore, the carry-in bit is not required to propagate through multiple stages sequentially as in a ripple carry adder. The CLA will require extra circuitry over a ripple carry adder. However, since the carry is not required to ripple through each stage sequentially, it can perform additions at a significantly greater speed.

Parallel array multipliers are a commonly used multiplier circuit in systems where increased performance is required. In one type of parallel array multiplier, the first step performed is the formation of a bit-product matrix. A bit-product matrix is simply an array of bit-products formed by multiplication of the individual bits of the two numbers being multiplied, a multiplicand and a multiplier. Formation of a bit-product matrix may become complicated in certain situations, such as multiplying signed numbers. In such cases, a specialized method for bit-product matrix formation may be required. Two common methods of bit-product matrix formation are the Baugh-Wooley method (as described in U.S. Pat. No. 3,866,030), and the Hatamian-Cash method. FIG. 1 is an illustration of a bit-product matrix formed by an 8-bit multiplicand and a 4-bit multiplier using the Baugh-Wooley method.

After the formation of a bit-product matrix, many multipliers simply add the rows of the matrix to obtain the final product. However, the efficiency of this process suffers as the number of bits in the multiplier and multiplicand become larger. One solution to this problem is to use a reduction scheme. Luigi Dadda proposes several such schemes in his paper entitled *Some Schemes for Parallel Multipliers* (1965). Each of these schemes, referred to Dadda reduction schemes, employs combinational parallel counter circuits (not to be confused with sequential, or clocked, counter circuits). These parallel counters are used to reduce the number of rows until only two rows remain, a sum row and a carry row. The sum row and carry row are then added to form the final product of the multiplication. A multiplier employing a reduction scheme will typically be significantly faster than a one that simply adds the rows of the bit-product matrix.

The reduction of a bit-product matrix is accomplished in a number of steps. For example, in one reduction scheme, a bit-product matrix formed from two 8-bit numbers using the Baugh-Wooley method will produce a matrix having two rows. Reduction of this matrix will require five steps using a Dadda reduction scheme. The first step of the reduction will involve receiving the ten-row matrix and reducing it to nine rows. The second step will reduce nine rows to six rows. The third step of the reduction reduces the matrix from six rows to four rows, the fourth step from four rows to three rows, and the fifth step from three rows to two rows. In a typical reduction unit, the entire reduction is performed in one action using combinational logic.

The final two rows are then added to form the final product of the multiplication.

Typically, the addition of the final two rows is performed by cascading several adders together. For example, if the final product is to be 16 bits wide, the final two rows may be added by cascading four 4-bit CLA's. The CLA circuits will add the two rows, four bits at a time, from the lowest order bits to the highest order bits.

FIG. 2 is a block diagram of a parallel array multiplier employing a reduction scheme. The multiplier is configured to receive, at the bit-product matrix unit, two binary numbers: a multiplier and a multiplicand. These numbers can be any number of bits, but will typically be 8 bits, 16 bits, or other integral powers of two. The multiplier forms a bit-product matrix, which is then reduced to a two-row matrix in the reduction unit. The two rows of this matrix are then added in the addition unit. The final output of the addition unit is the product of the multiplication.

Although the bit-product matrix formation, reduction, and addition are shown as separate blocks in the figure, the internal logic of the multiplier in FIG. 2 is combinational logic, so the entire multiplication is performed in one clock cycle.

Since the multiplier of FIG. 2 performs the entire multiplication in one clock cycle, the clock cycle must be long enough to allow all operations to complete before beginning a new multiplication. This can have a limiting effect on the clock speed due to the large amount of combinational logic used. This problem is compounded for larger operands, as additional steps of reduction require additional levels of logic, resulting in a higher gate delay. The fact that the multiplier can perform only one multiplication at a time limits throughput even further. It would be desirable to create a multiplier circuit that would allow for increased throughput, and thus higher performance. One way to achieve higher throughput is with a faster clock cycle. Thus, it would also be desirable to create a multiplier circuit with a faster clock cycle.

SUMMARY OF THE INVENTION

The problems outlined above may in large part be solved by a fully pipelined parallel multiplier with a fast clock cycle, as described herein. In one embodiment, a pipelined parallel multiplier circuit utilizes each step of both the reduction process and the addition process as pipeline stages. Circuits within the multiplier include a d-type latch circuit, a half-adder circuit, a full adder circuit, and a 4-bit carry-lookahead adder (CLA) circuit. Each of these circuits is configured to generate and/or receive required logic signals and their corresponding complements. The use of these circuits enables the individual stages of a reduction scheme and an addition scheme to be used as pipeline stages. The d-type latch circuits are particularly important, as they are used to latch results from stage to stage within the multiplier, and thus dominate the hardware complexity of the multiplier. The overall scheme is generally applicable to any combination of a bit-product matrix formation and reduction scheme.

In one particular embodiment, the fully pipelined parallel multiplier includes a bit-product matrix unit, a reduction unit, and an addition unit. The first stage of the multiplier pipeline is the bit-product matrix unit. This unit is configured to receive two binary numbers, a multiplicand and a multiplier. Typically, these two numbers will be of the same bit size (i.e. the same number of bits), although other embodiments may multiply two numbers of different bit sizes. The bit-product matrix unit then forms a matrix of partial products based on these two numbers, known as a bit-product matrix. A reduction unit, configured to receive the bit-product matrix, will then begin to reduce the matrix until only two rows remain.

The reduction of the bit-product matrix is accomplished in stages, and each of these stages is utilized as an individual pipeline stage. When the intermediate results of a first multiplication operation complete a particular stage, the stage may begin to process the intermediate results of a second multiplication operation. The number of stages in the reduction is dependent upon the particular scheme used and the size of the operands that the bit-product matrix unit is configured to receive. For example, if the bit-product matrix unit is configured to receive two 8-bit numbers, the reduction will require five different stages for one particular reduction scheme. In general, the reduction scheme will include M stages of reduction, where M is logarithmically proportional to the word size of the operands, assuming both the multiplier and multiplicand are of the same bit size. The final stage of the reduction results in a matrix of two rows, typically one row of sum bits and one row of carry bits. This two-row matrix is then received by the addition unit.

The addition unit adds the two rows of the received matrix, utilizing one or more cascaded adders. Each stage of the addition is also used as a pipeline stage. The number of required stages is dependent upon both the size of the operands and the size of the adders used. For example, if two 8-bit numbers are multiplied, they will produce a 16-bit product. By cascading four 4-bit CLA's, the final addition can be performed in four stages. The output of the final stage of the addition is the final product of the multiplication.

Thus, in various embodiments, the fully pipelined parallel multiplier may provide an advantageous increase in performance. By performing each step of the reduction and addition processes as pipeline stages, the clock cycle for each stage can be shortened. Furthermore, multiplications can be pipelined. This may result in an advantageous increase in throughput. The multiplier need not complete a multiplication before beginning another.

BRIEF DESCRIPTION OF THE DRAWINGS

Other objects and advantages of the invention will become apparent upon reading the following detailed description and upon reference to the accompanying drawings in which:

FIG. 1 (prior art) is an illustration of a bit-product matrix;

Figure 2:
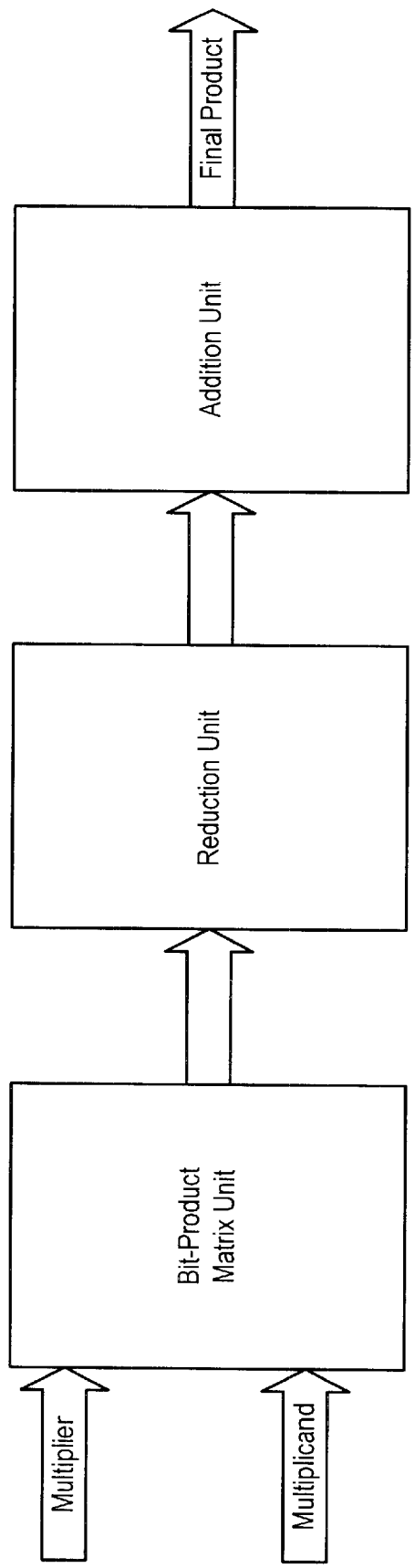
FIG. 2 (prior art) is a block diagram illustrating a multiplier employing bit-product matrix formation and a reduction scheme of the prior art.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scoped of the present invention as defined be the appended claims.

DETAILED DESCRIPTION OF THE INVENTION

Figure 4:
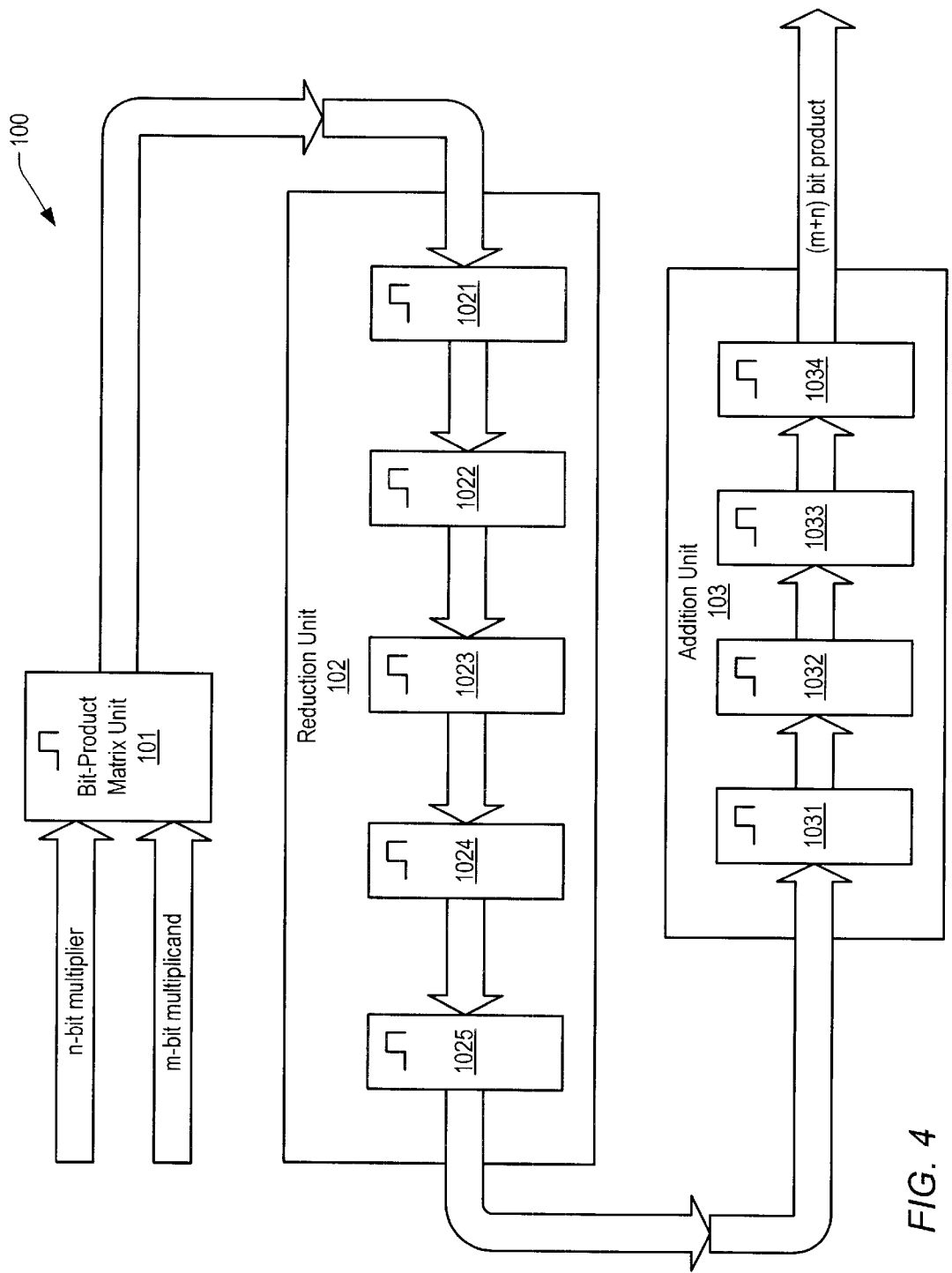
FIG. 4 is a block diagram of a pipelined parallel multiplier in which each stage of the reduction and each stage of the addition is used as a pipeline stage.

Turning now to FIG. 4, a block diagram of one embodiment of a fully pipelined parallel multiplier 100 is shown. Multiplier 100 is composed of three fundamental units: a bit-product matrix unit 101, a reduction unit 102, and an addition unit 103. The multiplier is configured to receive, at the inputs to bit-product matrix unit 101, an n-bit multiplier and an m-bit multiplicand, where n and m are the bit sizes of their respective numbers, and where both m>1 and n>1. In this embodiment, these two numbers are of the same bit size. The output of the multiplier, provided by addition unit 103, is the final product of the multiplication, and is of bit size m+n.

Bit-product matrix unit 101 is configured to form a matrix of partial products, and forms the first pipeline stage. Partial products are typically formed by logically ANDing two bits of the same significance together. Bit-product matrix unit 101 will form the bit product matrix according to a bit-product matrix scheme, such as the Baugh-Wooley scheme. Operations within bit-product matrix unit 101 occur within one clock cycle. Bit-product matrix unit 101 also includes a plurality of d-type latch circuits (not shown), which will be discussed in further detail below, for latching each of the individual bit-products to the next pipeline stage.

Reduction unit 102 includes a plurality of reduction stages 1021–1025. Generally, a given embodiment will include M stages of reduction, where M is logarithmically proportional to the word size of the operands (assuming the operands are of the same size). Operations within each stage occur within one clock cycle. Each reduction stage includes a plurality of d-type latch circuits, and may also include half-adders 200, full adders 300 (half-adders and full adders will be discussed in further detail below), and other assorted logic circuits. The first reduction stage 1021 is configured to receive a bit-product matrix from bit-product matrix unit 101. The first reduction stage then reduces the number of rows of the received bit-product matrix, and latches the reduced matrix to the next reduction stage 1022, using d-type latch circuits. Each subsequent reduction stage further reduces the number of rows, and feeds the results to the next stage via the d-type latch circuits. The final reduction stage 1025 in this embodiment will result in a two-row matrix: one row of sum bits and one row of carry bits. This two-row matrix is then latched to addition unit 103.

Addition unit 103 also includes a plurality of stages 1031–1034. Each addition stage represents an addition of a certain number of bits of the two-row matrix received from reduction unit 102. In this embodiment, the addition at each stage is performed by a carry lookahead adder (CLA) 400, which will be discussed in more detail below. The addition performed at each individual stage occurs within one clock cycle. The number of stages of addition is dependent upon the bit size of the numbers to be added and the bit size of the adder circuits used in each stage. Addition unit 103 also includes a plurality of d-type latch circuits, which are used to latch results from one stage to the next. The output of the final addition stage is the final product of the multiplication.

Figure 5:
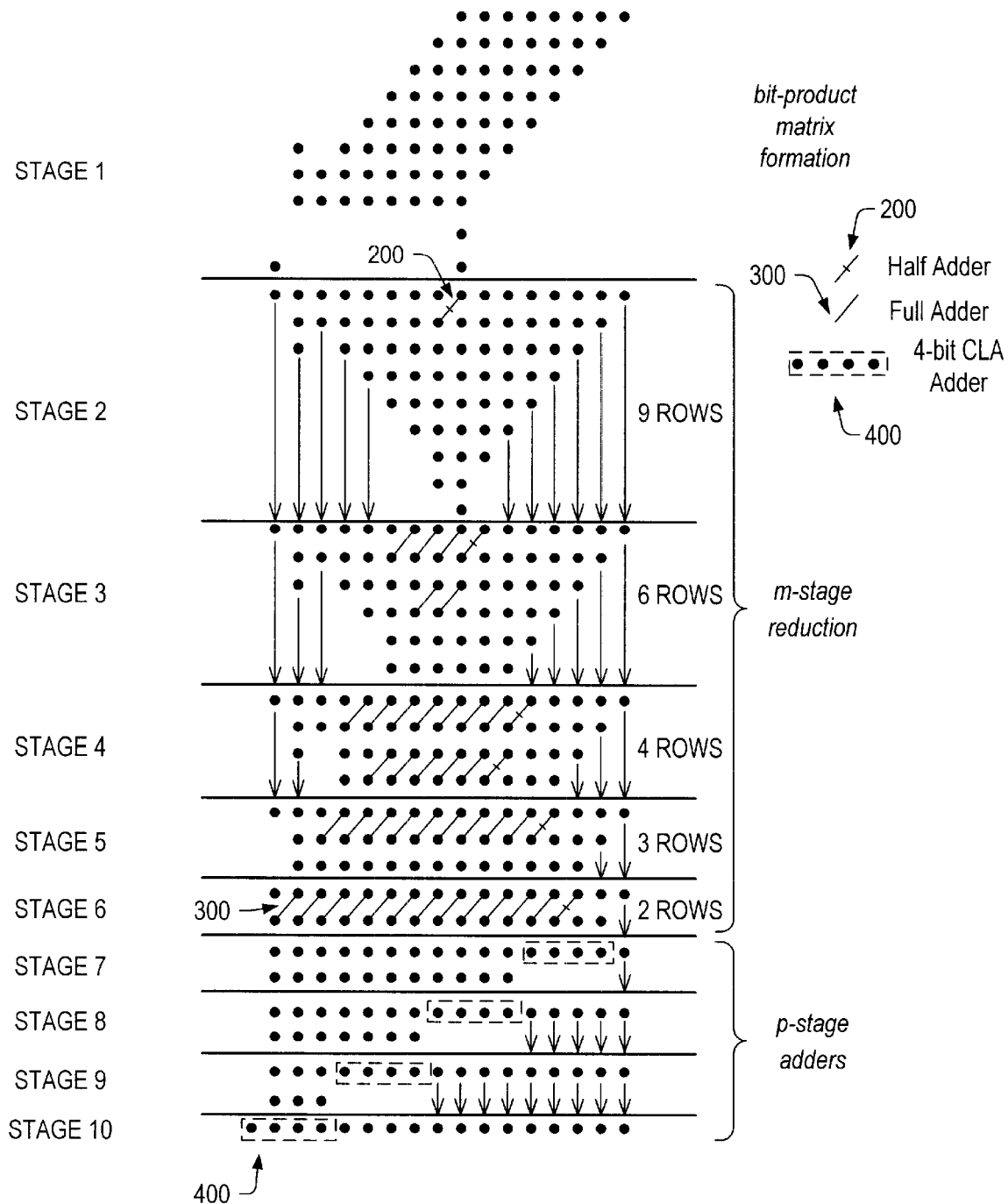
FIG. 5 is a drawing illustrating the operations within each pipeline stage.

Referring now to FIG. 5, a drawing illustrating operations within each pipeline stage is shown. Stage 1 of operations begins with formation of a bit-product matrix. In this embodiment, the Baugh-Wooley method is used to form the bit-product matrix of stage 1 for two 8-bit numbers. After formation, reduction of the bit-product matrix begins. In this embodiment, a Dadda reduction scheme is used. The original bit-product matrix is reduced to nine rows. The second stage further reduces the matrix to six rows, the third stage reduces the matrix to 4 rows, and the fourth stage to 3 rows. The fifth and final reduction stage reduces the matrix to two rows. One row consists entirely of sum bits, while the other row consists entirely of carry bits.

In order to perform the reduction, various logic circuits are required. Included in these logic circuits are a plurality of half-adders 200 and full-adders 300. The full-adders in this embodiment perform a 3:2 reduction of bit-products. This enables the 3:2 reduction of rows that occurs at a majority of reduction stages. Each full adder signal produces a sum output and a carry output, which eventually are placed in separate rows in the final stage of the reduction. D-type latch circuits for latching intermediate results to the next stage are also present between each of the stages of the reduction unit.

As previously stated, the final stage of the reduction results in a two-row matrix, with one row of sum bits and one row of carry bits. The two-row matrix is then latched to the addition unit. In the embodiment shown, four 4-bit CLA's 400 are cascaded to add the two rows and produce the 16-bit final product of the multiplication. D-type latch circuits between the stages latch intermediate results from one stage to the next. The addition is performed four bits at a time, and the carry-out of each CLA 400 is forwarded as an input to the CLA of the next pipeline stage. Lower order sum bits not involved in the addition at a given stage are simply latched to the next stage. The final output is a 16-bit number, which is the product of the multiplication. In this embodiment, a 17th bit position is available from the 4-bit CLA 400 in the final stage, however, this bit is sign-extended (the same bit as the sign-bit, which is the $16^{th}$ bit position).

It should be noted that logic operations within a given stage of this embodiment are performed only on a portion of the bit products. Columns of bit products that are not involved in any logic operation within a given pipeline stage are simply passed directly through that stage, as indicated in the drawing by the downward arrows. The absence of an arrow for a given column in the drawing indicates that those bit-products are involved in logical operations of the given stage. In this particular embodiment, the lowest order bit-product is latched through each pipeline stage, as no logic operations are required for the lowest order bit subsequent to formation of the bit product matrix.

Figure 6:
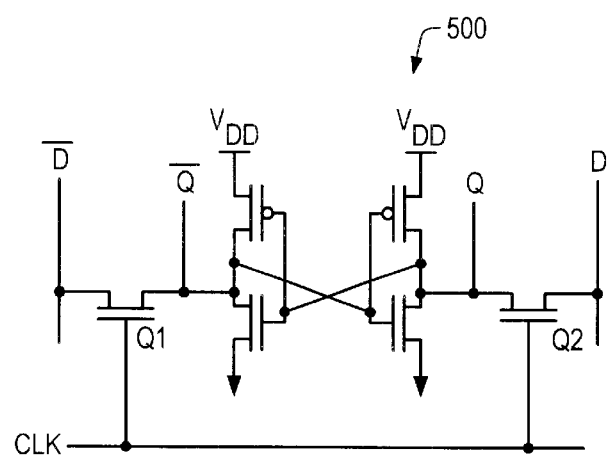
FIG. 6 is a schematic of a CMOS (Complementary Metal Oxide Semiconductor) implementation of the d-type latch circuit used in the pipelined parallel multiplier.

Referring now to FIG. 6, a schematic of a d-type latch circuit 500, as implemented in CMOS (complementary metal oxide semiconductor), is shown. This embodiment includes six MOSFET (Metal Oxide Semiconductor Field Effect Transistor) devices. The circuit is configured to receive a logic signal D, and its corresponding complement D-bar. Outputs from the circuit are Q and its corresponding complement, Q-bar. The circuit is designed to be a latch, and thus a change in the state of the inputs will cause a corresponding change in state of the outputs any time the clock pulse is high in this embodiment. When the clock pulse is high, MOSFETs Q1 and Q2 will be turned on, allowing data on the inputs to pass through to their respective outputs. The d-type latch circuits are the most prevalent circuit in this embodiment of the multiplier, as they are used to latch intermediate results of the multiplication from one pipeline stage to the next. The use of an inverted logic input enables the design of d-type latch 500 to be simple, which is necessitated by the large number of these circuit required to implement the multiplier.

Figure 3:
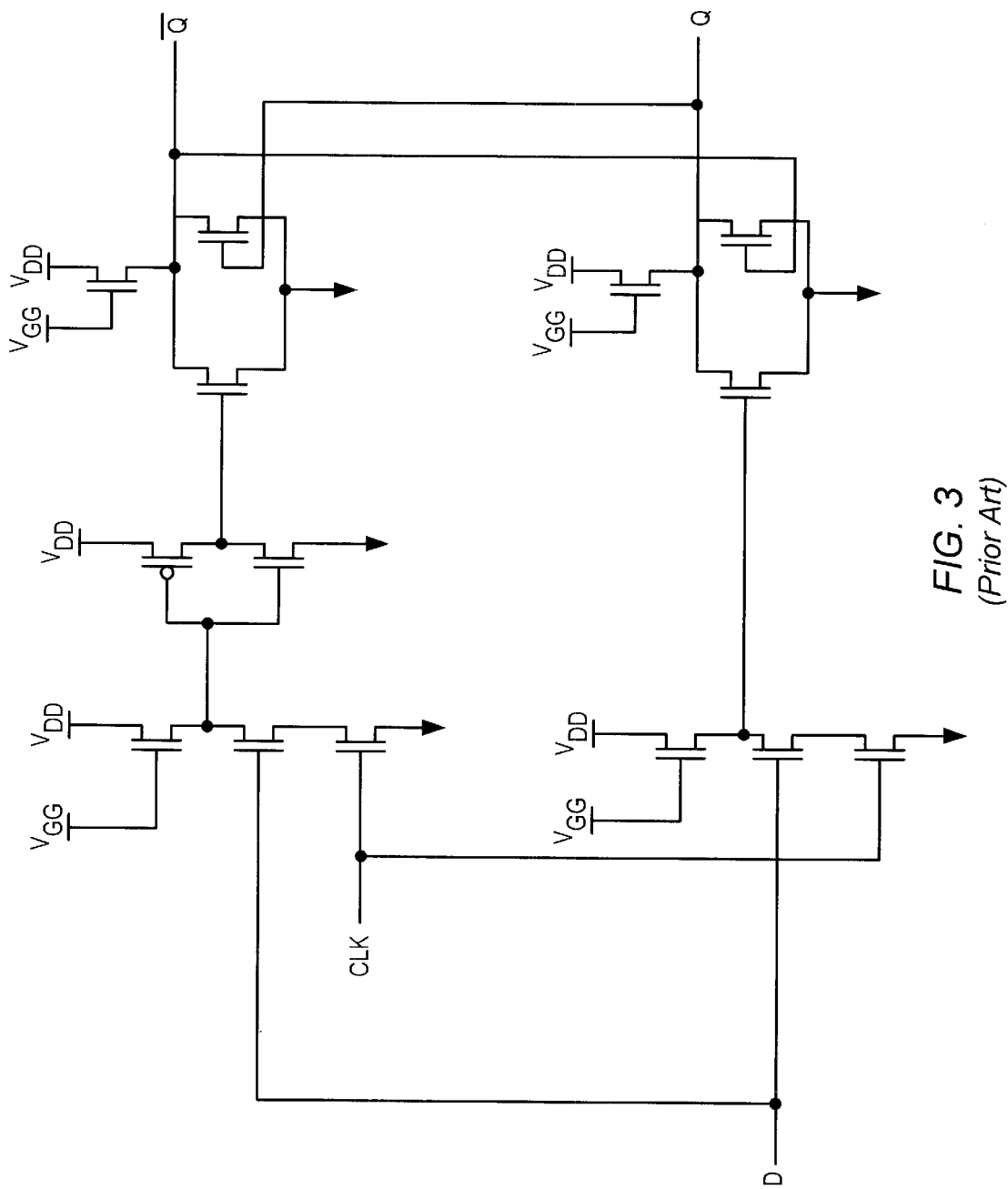
FIG. 3 (prior art) is a schematic of a d-type latch circuit of the prior art.

The simplicity of d-type latch circuit 500 is illustrated further by comparing it to a prior art d-type latch, shown in FIG. 3. The prior art d-type latch of FIG. 3 is not configured to receive a complemented form of the D input, in contrast to d-type latch circuit 500 of FIG. 6. Configuring d-type latch circuit 500 of FIG. 6 to receive the D input and its respective complement enables a simpler design, requiring only six MOSFET devices. The prior art d-type latch of FIG. 3 requires 18 MOSFET devices to implement. The implementation of stages in the multiplier is therefore made more practical by the use of the d-type latch circuit 500 of FIG. 6, since the complexity of the multiplier hardware is dominated by these latches.

Figure 7:
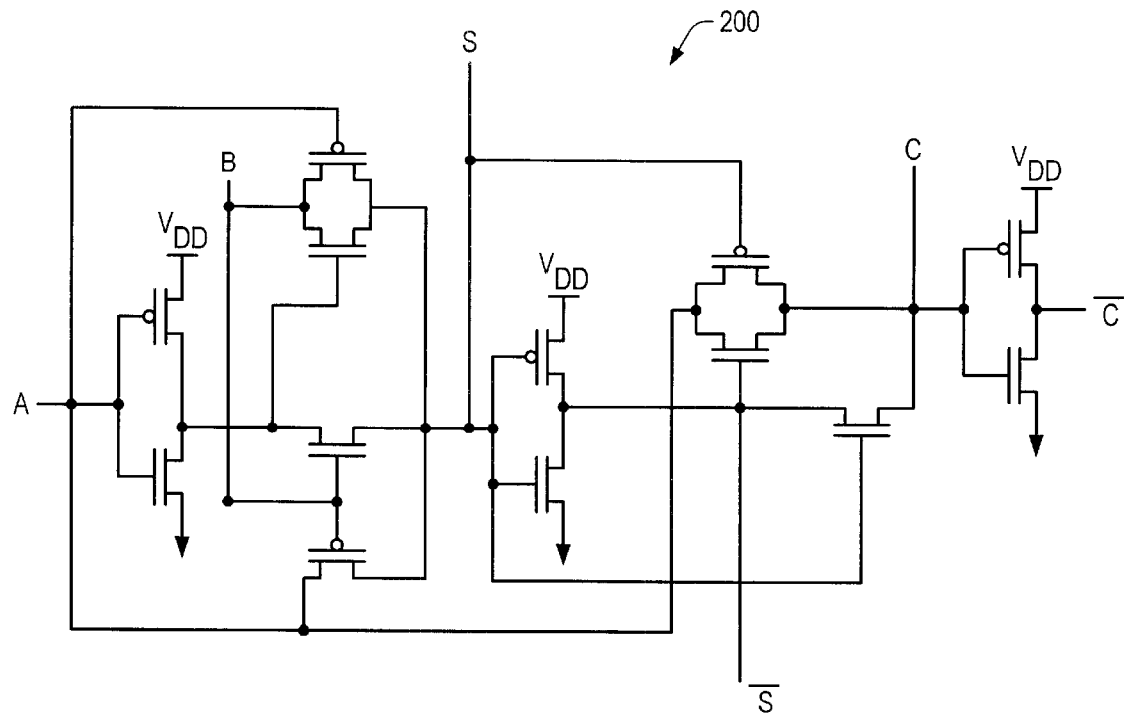
FIG. 7 is a schematic of the CMOS implementation of a half-adder circuit used in a pipelined parallel multiplier.

Turning now to FIG. 7, a schematic of the CMOS implementation of the half-adder circuit 200 for this embodiment is shown. The circuit includes a plurality of MOSFET devices. The circuit is configured to receive two single-bit inputs, A and B. Outputs from the half-adder circuit 200 are a sum bit S and corresponding complement, as well as a carry bit C and its corresponding complement. The complemented outputs are required to allow a half-adder circuit 200 to interface with a d-type latch circuit 500. The half-adder circuit 200 of this embodiment is used in the reduction unit 102 of FIG. 3.

Figure 8:
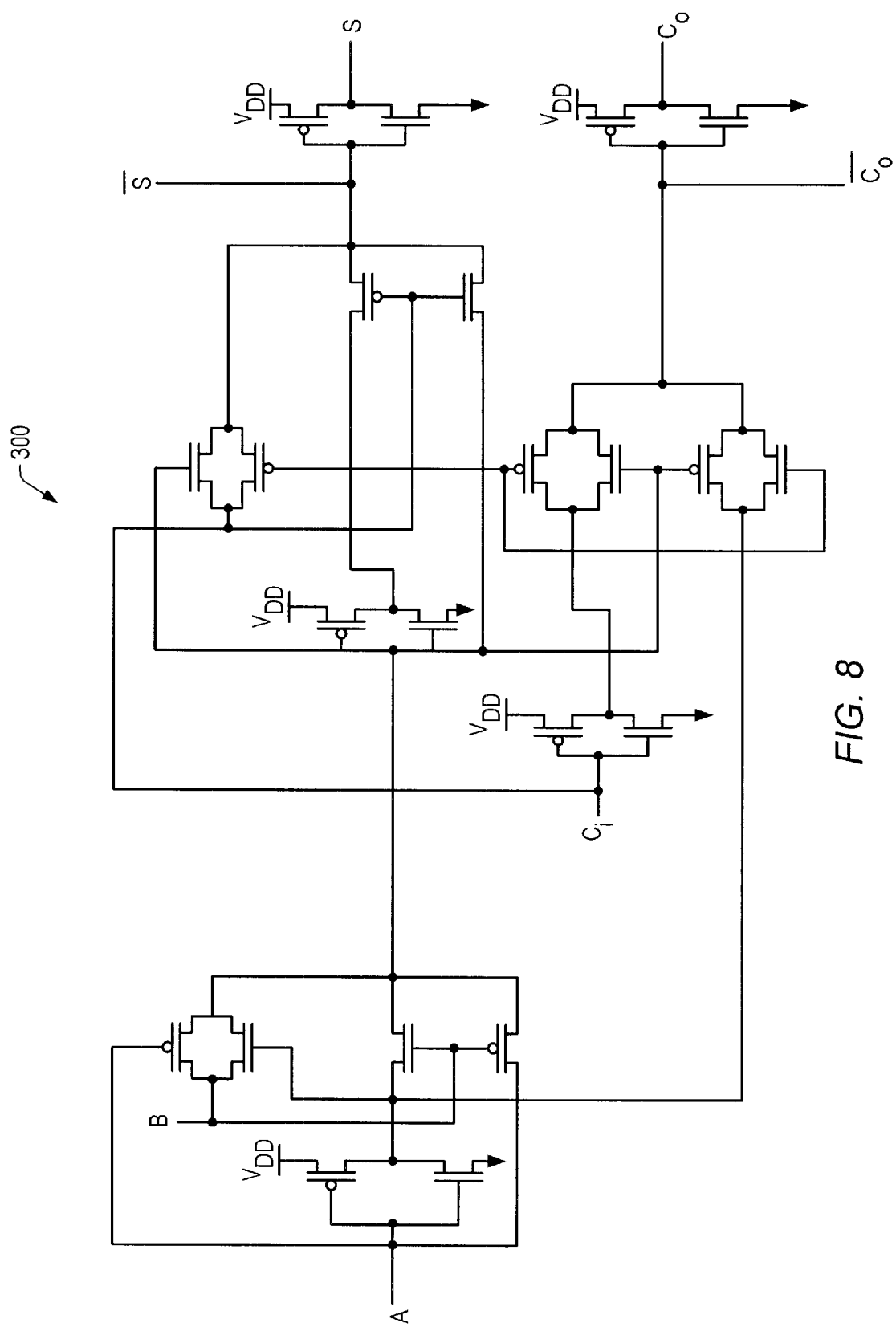
FIG. 8 is a schematic of the CMOS implementation of a full-adder circuit used in a pipelined parallel multiplier.

FIG. 8 is a schematic of the CMOS implementation of the full-adder circuit 300 used in the pipelined parallel multiplier. Full-adder circuit 300 includes a plurality of MOS-FETs 1000. The circuit is configured to receive three inputs. Two of these inputs are single-bit numbers, designated here as A and B. The third input, designated $C_i$, is a carry-in input. The carry-in input is used to receive a carry bit generated from an addition of lower order bits. The two operand bits, A and B, are combined with the carry-in bit, to generate two outputs, a sum bit, designated S, and a carry-out bit, designated $C_o$. In this embodiment, complements of both the sum bit and carry-out bit are generated to facilitate connection to the d-type latch circuits 500. Full-adder circuits 300 are used extensively in reduction unit 102.

Figure 9A:
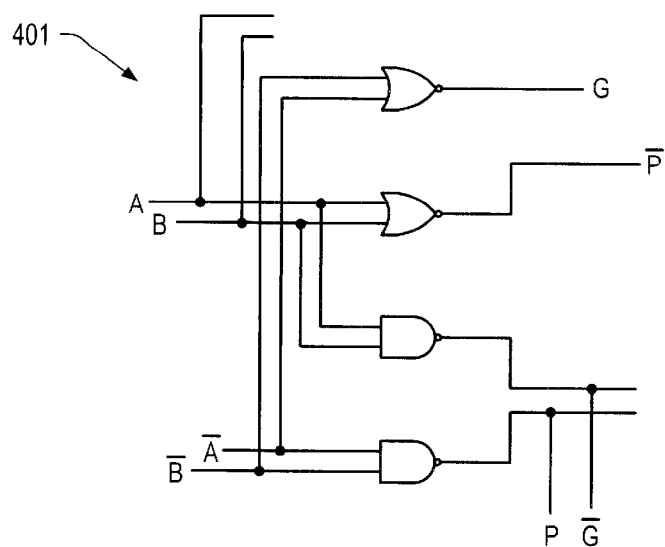
FIG. 9A is a schematic of a front-end circuit of a carry-lookahead adder (CLA), with p and g signal generation, used in a pipelined parallel multiplier.

FIG. 9A is a schematic of a front-end circuit 401 of 4-bit CLA 400. The circuit includes a plurality of logic gates. Front-end circuit 401 is configured to receive operand bits A and B, and their respective complements. The circuit generates output signals P (indicating the propagation of a carry bit through the respective bit position) and G (indicating that a carry bit is generated at the respective bit position). Complements of the P and G signals are generated as well. The P and G signals are then used as inputs to the 4-bit carry block 402, as is the complemented G signal. Inputs A and B are also used as inputs to a full adder circuit that provides the output bits of 4-bit CLA 400.

Figure 9B:
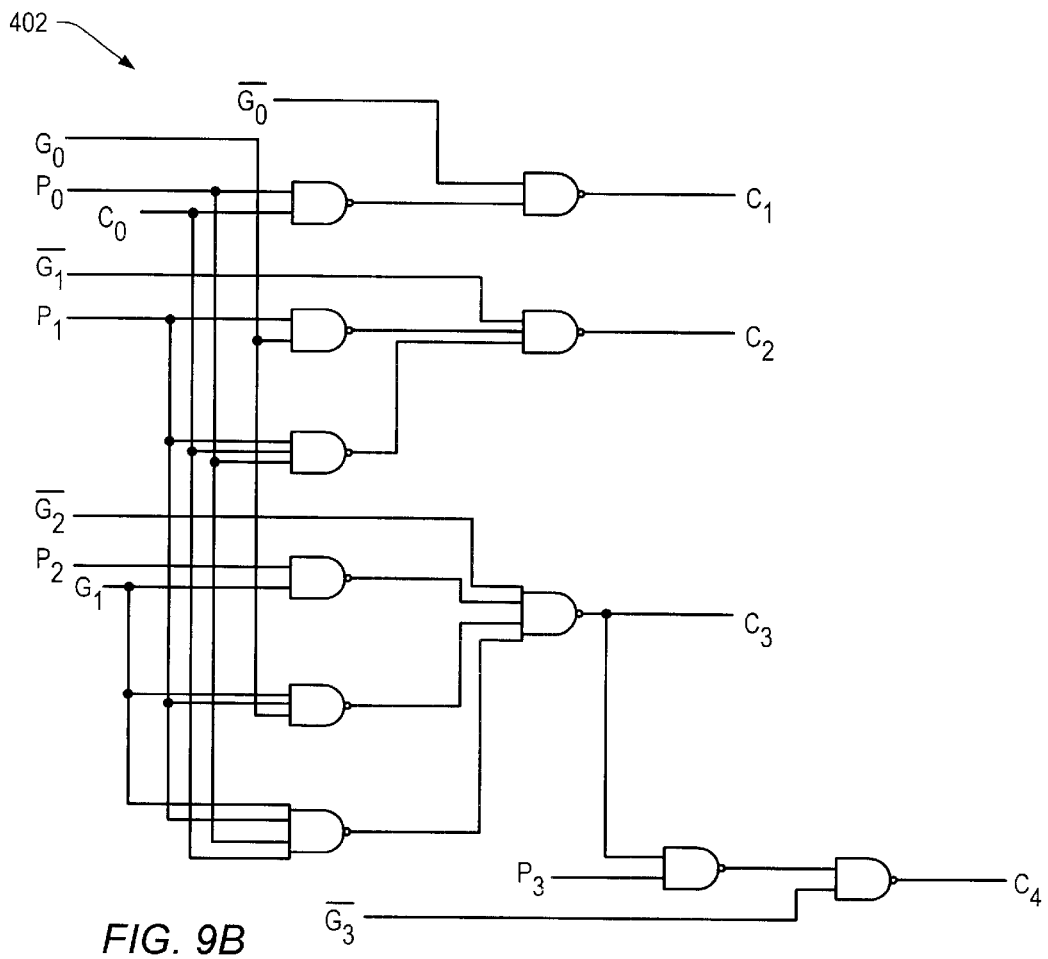
FIG. 9B is a schematic of a 4-bit carry block used to propagate carry bits in a carry lookahead adder (CLA) of an addition unit.

FIG. 9B is a schematic of the 4-bit carry block 402 used to propagate carry bits in addition unit of the pipelined parallel multiplier. Carry block 402 includes a plurality of logic gates. Each bit position of the circuit is configured to receive P and G signals from the front-end circuit, as well as a complemented G signal. Bit position 0 also is configured to receive a carry-in input, designated here as $C_0$. Four carry output signals, C1–C4, are generated by carry block 402. Each of these carry bits is used as an input to a full adder in the next higher bit position. For example, the output signal generated by inputs $P_0$ and $G_0$ (and the complement of $G_0$) is a carry bit to a full adder in bit position 1. This will be explained in further detail with FIG. 9C.

Figure 9C:
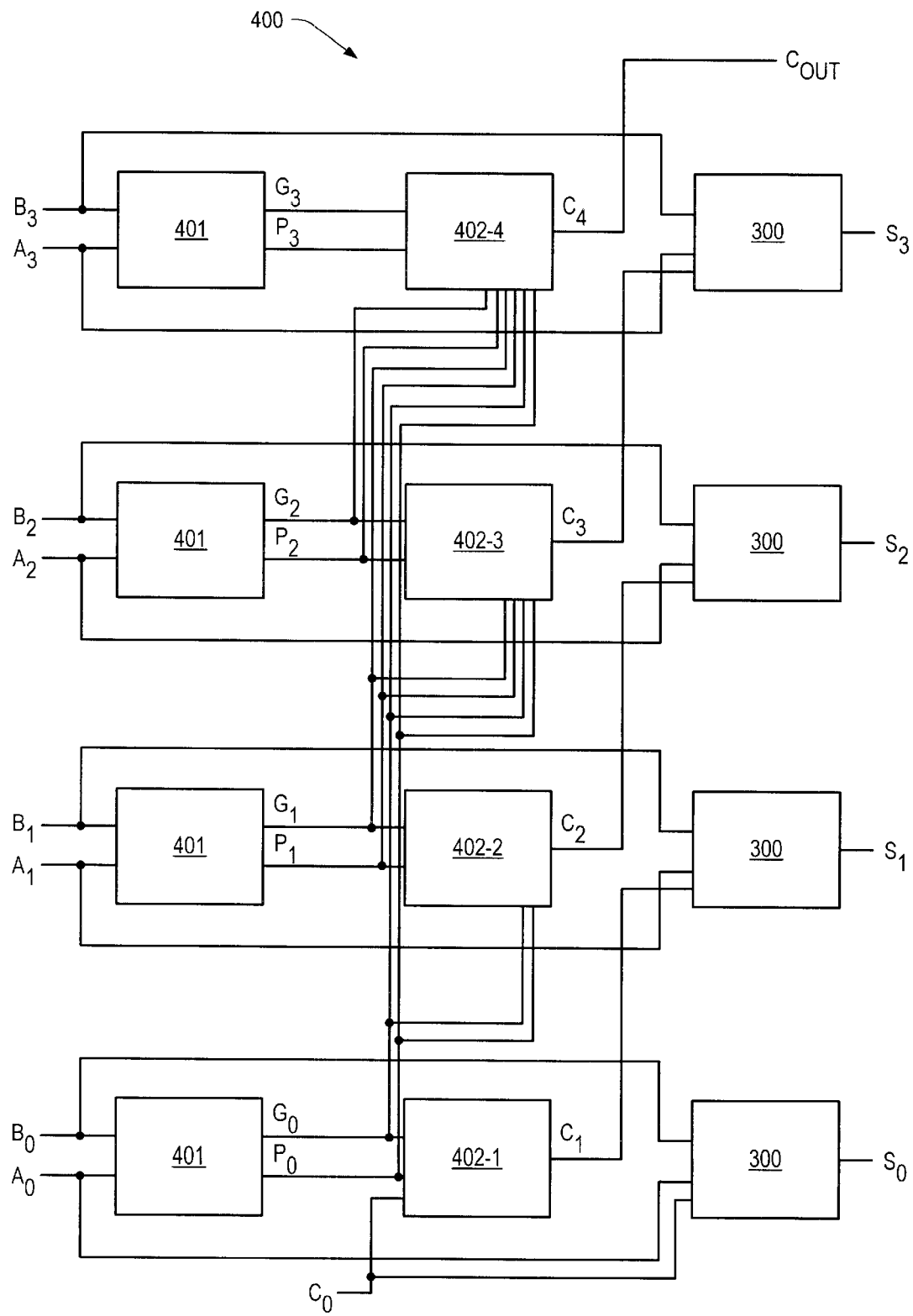
FIG. 9C is a block diagram illustrating a 4-bit CLA used in the addition unit.

FIG. 9C is a block diagram illustrating the 4-bit CLA 400 used in the addition unit 103 of FIG. 4. The 4-bit CLA is made up of four front-end circuits 401, a 4-bit carry block 402 (shown here as blocks 402-1 through 402-4), and four full adders 300. Operand bits to the multiplier are received by both the front-end circuits 401 and the full adders 300. The lowest order position of the 4-bit carry block, 402-1, also receives a carry-in input. This allows the cascading of the 4-bit CLA circuits in multiple stages, as is done in the addition unit. The front-end circuits generate P and G signals, which are used as inputs to their respective positions of carry block 402. Additionally, P and G signals generated at blocks 402-1 through 402-3 are used as inputs to all carry blocks 402 at higher bit positions. Each bit position of the carry block generates a carry signal, which is used as a carry-in input to the full adder 300 of the next higher bit position. Each full adder 300 also receives operand inputs A and B for the respective bit position, and generates a sum signal as an output.

It should be understood that while signal lines for the complemented form of signals A, B, and G are not shown in FIG. 9C, their presence is implied by reference to elements shown in previous figures. Representations of these signal lines were omitted from FIG. 9C for the sake of clarity.

The embodiment described above latches the intermediate results of the multiplication between the bit-product matrix unit, the reduction unit, and the addition unit to form separate pipeline stages. This embodiment also latches the intermediate results of both the reduction unit and the addition unit so that each of these units is further pipelined. It shall be noted that other embodiments may implement only a subset of the pipeline stages described above. For example, one embodiment may only latch intermediate results between the bit-product matrix unit, the reduction unit, and the addition unit to form three pipeline stages. Another embodiment may not latch intermediate results between these units, but may implement pipeline stages within only the reduction unit or only the addition unit. Any combination of these pipeline stages is contemplated to be within the scope of this disclosure.

Thus, the fully pipelined parallel multiplier, in various embodiments, allows for a faster clock cycle and higher throughput. A faster clock cycle is enabled by performing the steps of the reduction and addition as pipeline stages, along with the formation of the bit-product matrix. Since the multiplier is not required to fully complete one multiplication before beginning another, a higher throughput can be realized. The pipelining is enabled by the use of d-type latch circuits 500, which are used to latch results from one stage to the next. Since the d-type latch circuits 500 dominate the hardware complexity, they are designed to be simple. The overall scheme of the multiplier is generally applicable to any combination of a bit-product matrix formation and reduction scheme.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the invention as detailed within the following claims.

What is claimed is:

1. A pipelined parallel multiplier comprising:
   a bit-product matrix unit configured to receive an m-bit multiplicand and an n-bit multiplier and form a bit product matrix based on said m-bit multiplicand and said n-bit multiplier;
   a reduction unit configured to receive said bit product matrix and reduce said bit product matrix to a two-row matrix; and
   an addition unit configured to perform binary addition on said two-row matrix from to produce a product of said pipelined parallel multiplier;
   wherein said bit-product matrix unit forms a first clocked pipeline stage, wherein said reduction unit and said addition unit each form two or more clocked pipeline stages, and wherein intermediate results from each pipeline stage are latched as inputs to a next pipeline stage and wherein said latching is performed by d-type latch circuits, the d-type latch circuits including:
   a pair of cross-coupled inverters;
   a first input transistor and a second input transistor, wherein each of the first and second input transistors includes a gate terminal coupled to a clock line, an output terminal coupled to the pair of cross-coupled inverters, and an input terminal;
   wherein the first input transistor is coupled to receive a logic signal on its input terminal and the second input transistor is coupled to receive a complement input signal to the logic signal in its input terminal, and wherein the logic signal and the complementary logic signal are allowed to pass to the output terminal of the first input transistor and the second input transistor, respectively, responsive to a clock signal on the clock line being in a predetermined state.

2. The pipelined parallel multiplier as recited in claim 1, wherein said bit-product matrix unit includes a plurality of d-type latch circuits.

3. The pipelined parallel multiplier as recited in claim 2, wherein said d-type latch circuit is configured to receive logic signals and corresponding complements of said logic signals.

4. The pipelined parallel multiplier as recited in claim 1, wherein said reduction unit includes a plurality of d-type latch circuits, a plurality of half-adder circuits, and a plurality of full adder circuits.

5. The pipelined parallel multiplier as recited in claim 4, wherein said half-adder circuits and said full adder circuits are configured to generate a sum signal and corresponding complement of said sum signal.

6. The pipelined parallel multiplier as recited in claim 1, wherein said addition unit comprises a plurality of cascaded carry lookahead adder (CLA) circuits and a plurality of d-type latch circuits coupled between said CLA circuits.

7. The pipelined parallel multiplier as recited in claim 6, wherein said CLA circuit is configured to receive logic signals and corresponding complements of said logic signals.

8. The pipelined parallel multiplier as recited in claim 1, wherein operations in the first clocked pipeline stage, each of the two or more clocked pipeline stages of the reduction unit, and each of the two or more clocked pipeline stages of the addition unit occur within one clock cycle.

9. A method of pipelining operations within a parallel multiplier comprising:
    forming a bit-product matrix, wherein a bit-product matrix unit is configured to receive a m-bit multiplicand and an n-bit multiplier and form said bit-product matrix based on said m-bit multiplicand and said n-bit multiplier, and, wherein said bit-product matrix unit is a clocked pipeline stage;
    reducing said bit-product matrix using a reduction scheme, wherein said reduction scheme includes two or more stages, each of said stages being a clocked pipeline stage, and, wherein a reduction unit is configured to receive said bit product matrix and reduce said bit-product matrix to a two-row matrix; and
    adding said two-row matrix using an addition scheme, wherein said addition scheme includes two or more stages of binary addition, each of said stages being a clocked pipeline stage, and, wherein an addition unit is configured to receive said two-row matrix from said reduction unit, and, wherein output of said addition scheme is the final product of the multiplication;
    wherein intermediate results from each clocked pipeline stage are latched to a next pipeline stage by d-type latch circuits, the d-type latch circuits including:
    a pair of cross-coupled inverters;
    a first input transistor and a second input transistor, wherein each of the first and second input transistors includes a gate terminal coupled to a clock line, an output terminal coupled to the pair of cross-coupled inverters, and an input terminal;
    wherein the first input transistor is coupled to receive a logic signal on its input terminal and the second input transistor is coupled to receive a complement to the logic signal in its input terminal, and wherein the logic signal and the complementary logic signal are allowed to pass to the output terminal of the first input transistor and the second input transistor, respectively, responsive to a clock signal on the clock line being in a predetermined state.

10. The method as recited in claim 9 wherein operations within each of said pipeline stages occurs within one clock cycle.

11. The method as recited in claim 9 wherein said bit-product matrix unit includes a plurality of d-type latch circuits.

12. The method as recited in claim 9 wherein said reduction unit includes a plurality of d-type latch circuits, a plurality of half-adder circuits, and a plurality of full-adder circuits.

13. The method as recited in claim 12, wherein said d-type latch circuits are configured to receive logic signals and corresponding complements of said logic signals.

14. The method as recited in claim 12, wherein said half-adder circuits and said full-adder circuits are configured to generate a sum signal and corresponding complement of said sum signal.

15. The method as recited in claim 9 wherein said addition unit includes a plurality of d-type latch circuits, and a plurality of carry-lookahead adder (CLA) circuits.

16. The method as recited in claim 15, wherein said CLA circuits are configured to receive logic signals and corresponding complements of said logic signals.

17. The method as recited in claim 9, wherein said reduction scheme includes M stages of reduction, wherein M is logarithmically proportional to word size of said n-bit multiplier and said m-bit multiplicand, wherein n-bit multiplier and m-bit multiplicand are of equal word size.

18. The method as recited in claim 9 wherein said n-bit multiplier is of the same word size as said m-bit multiplicand.

19. The method as recited in claim 9, wherein said two-row matrix includes a row of sum bits and a row of carry bits.

20. A method of pipelining operations within a parallel multiplier comprising:
    forming a bit-product matrix in a clocked pipeline stage, wherein said bit-product matrix includes a plurality of partial products obtained by multiplying individual bits of an m-bit multiplier and an n-bit multiplicand;
    reducing said bit-product matrix to a two-row matrix, said reducing performed by a reduction unit having a two or more clocked pipeline stages;
    adding the rows of said two-row matrix together in an addition unit, the addition unit having two or more clocked pipeline stages, wherein the sum resulting from said adding the rows of said two-row matrix is the final product of a multiplication operation in said parallel multiplier wherein latching between each of the clocked pipeline stages is performed by d-type latch circuits, the d-type latch circuits including:
    a pair of cross-coupled inverters;
    a first input transistor and a second input transistor, wherein each of the first and second input transistors includes a gate terminal coupled to a clock line, an output terminal coupled to the pair of cross-coupled inverters, and an input terminal;
    wherein the first input transistor is coupled to receive a logic signal on its input terminal and the second input transistor is coupled to receive a complement to the logic signal in its input terminal, and wherein the logic signal and the complementary logic signal are allowed to pass to the output terminal of the first input transistor and the second input transistor, respectively, responsive to a clock signal on the clock line being in a predetermined state.

21. The method as recited in claim 20 further comprising latching intermediate results of said pipeline stages using d-type latch circuits coupled between said pipeline stages.

22. The method as recited in claim 20, wherein adding said rows of said two-row matrix is performed by a plurality of cascaded carry-lookahead adder (CLA) circuits having d-type latch circuits coupled between them.

23. The method as recited in claim 20, wherein said two-row matrix includes one row of sum bits and one row of carry bits.

24. The method as recited in claim 20, wherein said n-bit multiplier is of the same word size as said m-bit multiplicand.

25. The method as recited in claim 24, wherein said reduction scheme includes M stages of reduction, wherein M is logarithmically proportional to the word size of said n-bit multiplier and said m-bit multiplicand.

* * * * *